UNITED STATES PATENT OFFICE.

CARL DUISBERG, OF ELBERFELD, PRUSSIA, GERMANY, ASSIGNOR TO THE FARBENFABRIKEN, VORMALS FR. BAYER & CO., OF SAME PLACE.

PROCESS OF MAKING BLUE DYES.

SPECIFICATION forming part of Letters Patent No. 423,550, dated March 18, 1890.

Application filed September 12, 1889. Serial No. 323,741. (Specimens.) Patented in Germany December 5, 1883, No. 27,954; in England January 9, 1884, No. 1,099; in France August 8, 1889, No. 186,928, and in Italy September 30, 1889, XXIII, 26, LI, 297.

*To all whom it may concern:*

Be it known that I, CARL DUISBERG, doctor of philosophy, chemist, and a subject of the German Emperor, residing at Elberfeld, Prussia, German Empire, have invented certain new and useful Improvements in the Manufacture of New Coloring-Matters from Benzidine Sulphono-disulpho-acid,(for which I have obtained Letters Patent in Germany, dated December 5, 1883, No. 27,954, and in England, dated January 9, 1884, No. 1,099; in France August 8, 1889, No. 186,928, and in Italy September 30, 1889, XXIII, 26, LI, 297;) and I do hereby declare the following to be a full, clear, and exact description of the invention, such as will enable others skilled in the art to which it appertains to make and use the same.

The invention relates to the manufacture of coloring-matter, and has for its object to produce new coloring-matter or dye-stuffs for dyeing cotton, wool, and silk.

The invention consists in a novel process of obtaining these dye-stuffs by the reaction of tetrazo-diphenylsulphono-sulpho-acid upon alpha and beta naphthylamine and their alkyle derivatives, substantially as hereinafter fully described and claimed.

The benzidine sulphono-disulpho-acid required in the production of the new dye-stuffs is obtained by sulphonating benzidine sulphate with fuming sulphuric acid, and I proceed as follows: One part of benzidine sulphate is gradually added to 4.5 parts, by weight, of fuming sulphuric acid of about forty per cent. anhydrous acid. The temperature of the melt rises to about 80° centigrade, the benzidine sulphate being converted into benzidine sulphone. To convert the latter into the desired disulpho-acid, the melt is heated for some hours to about 160° centigrade, or until it forms a clear solution in alkaline water, and no precipitate results by addition of acetic acid to the solution, which would prove benzidine sulphono-monosulpho-acid. The melt is then poured on ice, the insoluble disulpho-acid filtered off, and the soda salt formed. This soda salt dissolves readily in hot, but with difficulty in cold, water, and crystallizes in fine yellow needles. The free benzidine sulphono-disulpho-acid itself also dissolves readily in hot, but not readily in cold, water, and forms or represents a yellowish powder, forming an insoluble tetrazo compound. The tetrazo compound of this benzidine sulphono-disulpho-acid is combined with alpha or beta naphthylamine or their alkyle derivatives.

In order that my invention may be fully understood I will describe the process in detail by the following example: Thirty-one kilos of the sodium salt of benzidine sulphono-disulpho-acid are dissolved in water suitably cooled and acidulated with hydrochloric acid, and to this solution I add, slowly, fifteen kilos of sodium nitrite. After allowing this to stand some hours the tetrazo compound formed is filtered off, and a solution of thirty-one kilos of paratolylbeta-naphthylamine dissolved in three hundred kilos of alcohol is added under constant stirring. The solution immediately assumes a deep blue color, and the dye-stuff forms after a little while, the dye-stuff acid being precipitated by the addition of water.

In order to convert this acid into the dye-stuff itself, the said acid is filtered off and treated with a diluted solution of sodium carbonate. The resulting dye-stuff, which is insoluble in cold water, is filtered off and dried. It dyes cotton in an alkaline bath and wool in a neutral bath a fine indigo-blue.

Having described my invention, what I claim, and desire to secure by Letters Patent, is—

The herein-described process of obtaining blue coloring-matter that will dye cotton in an unmordanted bath and wool in a neutral bath, which consists in combining the tetrazo compound of benzidine disulphono-disulpho-acid with alpha or beta naphthylamine, or their alkyle derivatives.

In testimony whereof I affix my signature in presence of two witnesses.

CARL DUISBERG.

Witnesses:
PHILIPP OTT,
CARL KRÜGER.